(12) United States Patent
Bucklew et al.

(10) Patent No.: US 11,581,947 B2
(45) Date of Patent: Feb. 14, 2023

(54) UNDERWATER COMMUNICATIONS SYSTEM HAVING SELECTABLE BEAM AND ASSOCIATED METHODS

(71) Applicant: EAGLE TECHNOLOGY, LLC, Melbourne, FL (US)

(72) Inventors: Victor G. Bucklew, Richmond, VA (US); Fraser R. Dalgleish, Vero Beach, FL (US); Donna M. Kocak, Indian Harbour Beach, FL (US); Shiloh Dockstader, Oakton, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 176 days.

(21) Appl. No.: 17/218,261

(22) Filed: Mar. 31, 2021

(65) Prior Publication Data
US 2022/0321229 A1 Oct. 6, 2022

(51) Int. Cl.
| | |
|---|---|
| *H04B 13/02* | (2006.01) |
| *H04B 10/112* | (2013.01) |
| *H04B 10/50* | (2013.01) |
| *H04B 10/516* | (2013.01) |

(52) U.S. Cl.
CPC ....... *H04B 10/505* (2013.01); *H04B 10/1127* (2013.01); *H04B 10/516* (2013.01); *H04B 13/02* (2013.01); *H04B 10/112* (2013.01)

(58) Field of Classification Search
None
See application file for complete search history.

(56) References Cited

U.S. PATENT DOCUMENTS

| | | | |
|---|---|---|---|
| 7,557,930 B2* | 7/2009 | Werner | G01B 9/02035 356/521 |
| 7,609,972 B2* | 10/2009 | Cunningham | H04B 10/1127 398/118 |

(Continued)

FOREIGN PATENT DOCUMENTS

| | | |
|---|---|---|
| AU | 2013208069 | 8/2017 |
| EP | 1360844 | 11/2003 |

(Continued)

OTHER PUBLICATIONS

Schildkraut et al., Investigating the Role of Spatiotemporal Optical Beam Profiles in Mixed Layer Ocean Communication Channels, 2020, IEEE (Year: 2020).*

(Continued)

*Primary Examiner* — Jai M Lee
(74) *Attorney, Agent, or Firm* — Allen, Dyer, Doppelt + Gilchrist, P.A.

(57) ABSTRACT

An underwater communications system may include a first device and a second device being movable relative to one another. The first device may include a first laser transmitter configured to generate a first laser beam having a selectable spatiotemporal beam shape from among a plurality thereof, and a first controller coupled to the first laser transmitter and configured to select a spatiotemporal beam shape for the first laser beam from among the spatiotemporal beam shapes. The second device may include a second laser receiver configured to receive the first laser beam, and a second controller coupled to the second laser receiver.

22 Claims, 7 Drawing Sheets

(56) References Cited

U.S. PATENT DOCUMENTS

| | | | |
|---|---|---|---|
| 7,991,294 B2* | 8/2011 | Dreischer | H04L 25/4902 398/137 |
| 8,229,304 B1 | 7/2012 | Pepper et al. | |
| 8,655,178 B2* | 2/2014 | Capron | H04B 10/112 398/118 |
| 8,818,197 B2* | 8/2014 | Jenson | H04B 10/1127 398/135 |
| 9,054,424 B1* | 6/2015 | Hunt | H01Q 19/13 |
| 9,071,393 B2 | 6/2015 | Sturkovich et al. | |
| 9,203,524 B2* | 12/2015 | Simpson | H04B 13/02 |
| 9,245,803 B1* | 1/2016 | Park | H01L 21/3065 |
| 10,256,918 B2* | 4/2019 | Harris | H04B 10/112 |
| 10,491,309 B1* | 11/2019 | Rao | H04B 10/80 |
| 2003/0053175 A1 | 3/2003 | Szczepanek et al. | |
| 2005/0147415 A1 | 7/2005 | Fee et al. | |
| 2008/0025728 A1 | 1/2008 | Shpantzer et al. | |
| 2008/0240718 A1* | 10/2008 | Werner | H04B 10/1121 398/96 |
| 2011/0229141 A1* | 9/2011 | Chave | H04B 13/02 398/104 |
| 2012/0263461 A1 | 10/2012 | Lowery et al. | |
| 2014/0206367 A1 | 7/2014 | Agee et al. | |
| 2014/0270749 A1 | 9/2014 | Miniscalco et al. | |
| 2016/0127042 A1 | 5/2016 | Farr et al. | |
| 2017/0302387 A1* | 10/2017 | Kim | H04B 10/25891 |

FOREIGN PATENT DOCUMENTS

| | | |
|---|---|---|
| JP | 2013507795 | 3/2013 |
| JP | 2016517655 | 4/2018 |
| KR | 20050072765 | 7/2005 |
| KR | 20170013390 | 2/2017 |
| WO | 01008422 | 2/2001 |
| WO | 2011041832 | 4/2011 |
| WO | 2017152173 | 9/2017 |

OTHER PUBLICATIONS

Campagnaro et al., "Multimodal Underwater Networks: Recent Advances and a Look Ahead," WUWNET '17, 2017 Association for Computing Machinery, Nov. 6-8, 2017, pp. 1-8.

Zhaoquan Zeng; "A Survey of Underwater Wireless Optical Communication," Thesis submittal in partial fulfillment of requirements for degree of Master of Applied Science, University of British Columbia, Dec. 2015, pp. 1-102.

Cheng et al., "Channel Capacity of the OAM-Based Free-Space Optical Communication Links With Bessel-Gauss Beams in Turbulent Ocean," IEEE Photonics Journal, vol. 8, No. 1, Feb. 2016, pp. 1-13.

Ali et al., "Underwater Communications: Recent Advances," Conference paper, Conference: International Conference on Emerging Technologies of Information and Communications (ETIC), 2019, pp. 1-7.

Zhao et al., "Propagation and Self-Healing Properties of Bessel-Gaussian Beam Carrying Orbital Angular Momentum in An Underwater Environment," Scientific Reports; 9:2025, Feb. 14, 2019, pp. 1-8.

Ferrero et al., "Optical Phase Locking techniques: an overview and a novel method based on Single Side Sub-Carrier modulation," Optics Express, vol. 16, No. 2, Jan. 21, 2008, pp. 1-11.

Net et al., "Optical Telemetry Ranging," IPN Progress Report, 42-221, May 15, 2020, pp. 1-23.

Schildkraut et al., "Investigating the Role of Spatiotemporal Optical Beam Profiles in Mixed Layer Oceanic Communication Channels," Poster competition, Oceans Conference & Exposition, IEEE Oceanic Engineering Society, Oct. 5-30, 2020, p. 1.

Hemphill et al., "Hybridized Wavefront Shaping for High-Speed, High-Efficiency Focusing through Dynamic Diffusive Media," J. Biomed. Opt. 21(12), 121502, doi: 10.1117/1.JBO.21.12.121502, Dec. 2016, pp. 1-7.

O'Rourke et al., "Multi-Modal Communications in Underwater Sensor Networks Using Depth Adjustment," WUWNet'12, Nov. 5-6, 2012, pp. 1-5.

Yin et al., "Adaptive Turbulence Compensation with A Hybrid Input-Output Algorithm in Orbital Angular Momentum-Based Free-Space Optical Communication," Applied Optics, vol. 57, No. 26, Sep. 10, 2018, pp. 1-8.

Kaushal et al., "Underwater Optical Wireless Communication," IEEE Access, DOI: 10.1109/ACCESS.2016.2552538, Apr. 11, 2016, pp. 1-30.

Kaushal et al., "Free Space Optical Communication: Challenges and Mitigation Techniques," arXiv:1506.04836v1, Jun. 25, 2015, pp. 1-28.

* cited by examiner

UNDERWATER COMMUNICATIONS SYSTEM HAVING SELECTABLE BEAM AND ASSOCIATED METHODS

FIELD OF THE INVENTION

The present invention relates to communication systems, and, more particularly, to underwater communications systems and related methods.

BACKGROUND OF THE INVENTION

Underwater communications systems have become more important since oceanic environmental and exploratory activities have increased, including oceanographic data collection, water sampling, and environmental studies. These underwater communications systems are usually wireless and employed also in coastal security, natural resource investigations, mapping and discovering unknown regions of underwater terrain, oceanic experimental observations and data analysis, underwater navigation, disaster prevention, and early detection warnings of tsunamis. Different underwater wireless communications used in these various services have included optical, acoustic, and electromagnetic (EM) systems. The quality and reliability of data transmission in both shallow and deep water are dependent on the physical characteristics of the water channel, the physicochemical properties of the water medium, and the physical characteristics of the optical, acoustic and EM carrier waves. Water properties that affect EM carrier waves include the water density, which can vary with temperature, high permittivity, electrical conductivity, salinity, turbidity, and EM noise levels present during communication. Acoustic communications are limited in propagation distance and may be attenuated by water turbidity, and have low frequency, bandwidth and low speed such as around 1,500 m/s.

Optical underwater communications systems using laser transmitters or other light sources, however, are becoming an area of greater research because of the potential to increase data capacity in transmission and potential use of commercial-off-the-shelf (COTS) devices. However, establishing and maintaining optical communication links between different devices, such as a buoy and a submersible, in a degraded water environment presents a challenge. Absorption and scattering are two crucial factors that affect the propagation of optical waves in underwater environments. As a result, optical transceivers make performance trades that may limit the optimal performance of an optical underwater communications system. Even where a data rate between devices is balanced relative to the distance between the devices in an optical underwater communications system, dynamic link conditions often may lead to degraded or intermittent optical communications service.

Some state-of-the-art optical underwater communications systems change the carrier using a multi-modal approach, e.g., employing an acoustic signal to enable long range, but very low data rate communications up to 100 to 1,000 km. When conditions permit, these systems switch to an optical system to provide shorter range, but much higher data rate communications. Switching between the acoustic and optical communications has been found to bridge performance gaps in some underwater communications systems. Other underwater communications systems employ an adaptive phase approach by changing the phase of the subcarrier. For example, corrections to the phase front may optimize performance in degraded underwater communications links with an increased power at the receiver and a lowered drop rate.

As the underwater communication link conditions change, the phase front may be changed and performance across the changing link environments may be more readily equalized. In these approaches, however, once a carrier is selected, for example, an optical or RF carrier, the sub-carrier profile as the spatiotemporal beam profile of the carrier is fixed and generally assumed to be Gaussian. Optimization strategies, such as phase front correction, are then applied to that sub-carrier profile. There are many possibilities for the sub-carrier profile, however, and each possibility may have benefits that may be exploited to improve communications link performance.

SUMMARY OF THE INVENTION

In general, an underwater communications system may include a first and a second device being movable under water relative to one another. The first device may include a first laser transmitter configured to generate a first laser beam having a selectable spatiotemporal beam shape from among a plurality thereof. A first controller may be coupled to the first laser transmitter and configured to select a spatiotemporal beam shape for the first laser beam from among the plurality of spatiotemporal beam shapes. The second device may include a second laser receiver configured to receive the first laser beam, and a second controller coupled to the second laser receiver.

The plurality of spatiotemporal beam shapes may comprise a Gaussian beam shape and a Bessel-Gaussian beam shape. The first controller may be configured to select the selectable spatiotemporal beam shape based upon a range between the first and second devices. In an example, the first controller may be configured to select the selectable spatiotemporal beam shape based upon the range between the first and second devices in accordance with one of a start-up procedure and a predetermined protocol. The second device may comprise a second laser transmitter coupled to the second controller and configured to generate a second laser beam, and the first device may comprise a first laser receiver coupled to the first controller and configured to receive the second laser beam. The first controller may be configured to select the selectable spatiotemporal beam shape based upon the second laser beam.

The first laser transmitter may also have at least one other selectable parameter, and the first controller may be configured to select the at least one other selectable parameter. The other selectable parameter may comprise at least one of a spatial beam size, a spatial beam divergence, and a temporal width beam. The first device may comprise at least one of a spatial light modulator, grating assembly, and telescoping lens associated with the first laser transmitter. The second device may comprise a bandpass filter associated with the second laser receiver.

Another aspect is directed to a method of operating a first device of an underwater communications system and being moveable relative to a second device of the underwater communications system. The method may include operating a first laser transmitter of the first device to generate a first laser beam toward the second device and having a selectable spatiotemporal beam shape from among a plurality thereof, and operating a first controller of the first device to select a spatiotemporal beam shape for the first laser beam from among the plurality of spatiotemporal beam shapes.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
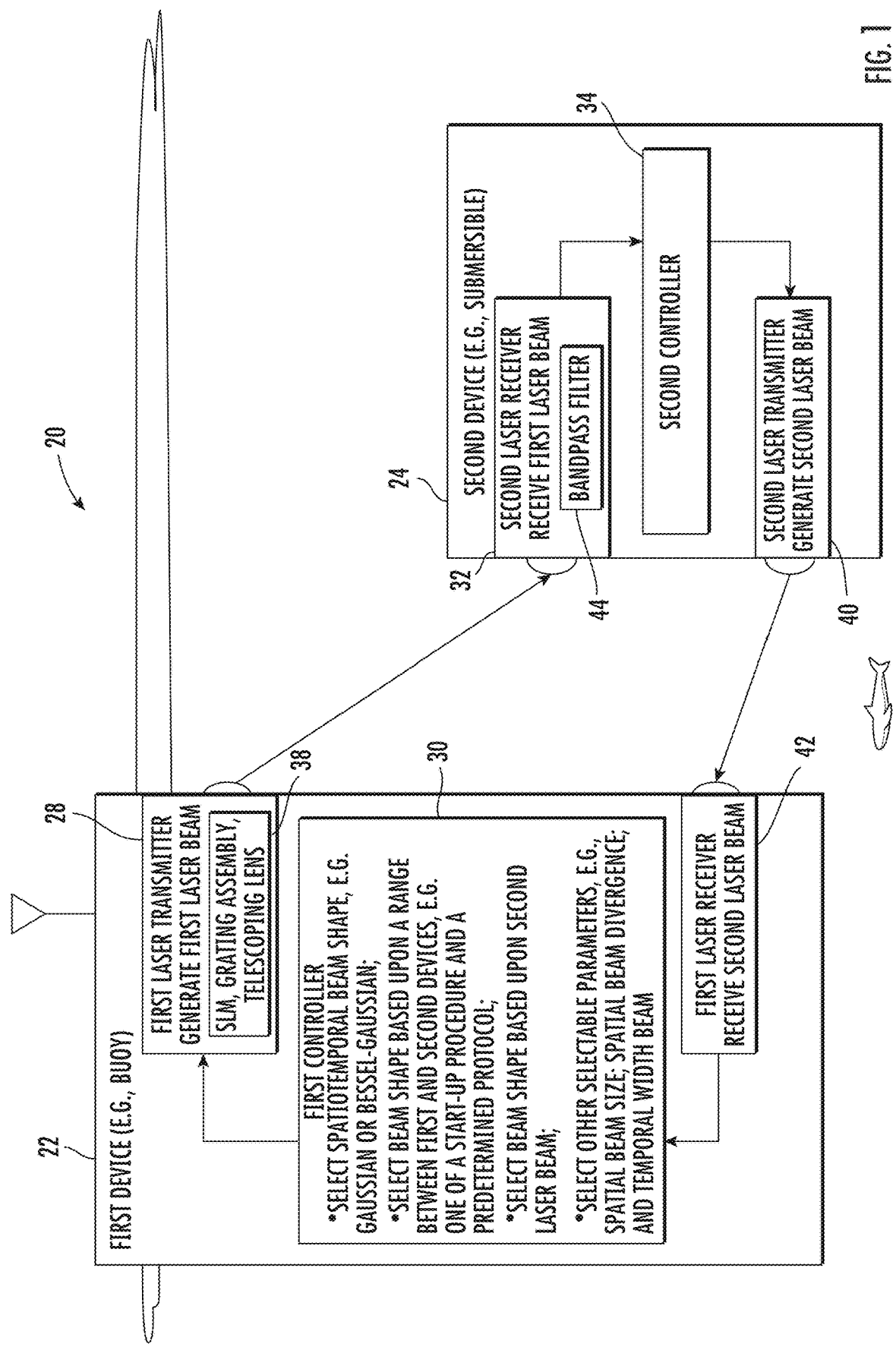
FIG. 1 is a block diagram of the underwater communications system according to the invention.

Referring initially to FIG. 1, an underwater communications system is illustrated generally at 20. This system 20 includes a first device 22, e.g., a buoy, and a second device 24, e.g., a manned submersible or an unmanned underwater vehicle. Both the first and second devices 22,24 are movable relative to one another underwater. The first device 22 as a buoy may have a separate RF transceiver (not illustrated) that communicates with aircraft, ships, or other ground and sea-based communication devices and receives data that is communicated to the second device 24. The underwater communications system 20 may operate between two divers that carry respective first and second devices 22,24 as separate communication devices.

The first device 22 includes a first laser transmitter 28 that is configured to generate a first laser beam having a selectable spatiotemporal beam shaped from among a plurality of spatiotemporal beam shapes that are stored as waveforms and associated parameters. A first controller 30 is coupled to the first laser transmitter 28 and configured to select the spatiotemporal beam shaped for the first laser beam from among the plurality of spatiotemporal beam shapes stored at the first device 22.

The second device 24 includes a second laser receiver 32 configured to receive the first laser beam and a second controller 34 coupled to the second laser receiver 32. In an example, the different spatiotemporal beam shapes may include a Gaussian beam shape and a Bessel-Gaussian beam shape. The Bessel-Gaussian beam shape may represent a Bessel beam truncated with a Gaussian aperture and mimics some of the non-diffraction characteristics of an ideal Bessel beam, although the infinite energy and spatial extent of an ideal Bessel beam may not be achievable in the optical communications system 20.

The Bessel-Gaussian beam may have a quasi, non-diffracting characteristic that may have an impact on the aperture requirements for any optics associated with the first laser transmitter 28. Bessel beams have a central lobe with a spot size, and repeating lobes on either side that quickly dampen as a function of distance from the central lobe. Although ideal Bessel beams are infinite in energy and spatial extent, they may not be achievable waveforms, and thus, Bessel-Gaussian beams are instead generated that use a Bessel beam of a given spot size truncated by a Gaussian aperture with a larger radius. The Bessel-Gaussian beam thus diffracts less than a Gaussian counterpart beam.

In an example, a 1.0 millimeter radius aperture may be configured at the second laser receiver 32 and the Bessel-Gaussian beam with the 1.0 millimeter spot size may enable more continuous service across a range of depths when compared with a standard Gaussian beam having the same beam size, without requiring a high dynamic range control over the optical output power from the laser transmitter. For a 5.0 millimeter initial spot size, neither the Gaussian nor the Bessel-Gaussian beam diffract much, but the performance of the Gaussian beam is more consistent because its propagation is not impacted by the Gaussian aperture as with the Bessel-Gaussian beam. The Bessel-Gaussian beam may also have an advantage under these circumstances because its low power wings extend out to a greater 25.4 millimeters, which may provide a spatial extent required for establishing and maintaining a communications link in the presence of platform motion uncertainty, beam jitter and scattering in the underwater communications system 20, such as when the first device 22 is a buoy moving and rolling on the surface waves, and the second device 24 is a submersible rapidly moving underwater relative to the first device.

It is also possible for the first laser transmitter 28 to generate an Airy beam as a propagation and variant wave where the main intensity lobes propagate along a curved parabolic trajectory, while having some self-healing attributes. As the Airy beam propagates, it does not diffract or spread out and bends to form a parabolic curve. Depending on underwater conditions such as currents, thermoclines and other adverse oceanic conditions, use of an Airy beam may be advantageous.

In an example, the first controller 30 may be configured to select the selectable spatiotemporal beam shape based upon a range between the first device 22 and second device 24, for example, in accordance with one of a start-up procedure and a predetermined protocol. The start-up procedure could start by generating at the first laser transmitter 28 a defined Gaussian beam and incorporating a defined aperture at the second laser receiver 32 when the second device 24 is submerged at only a few meters. As the first device 22 and second device 24 move relative to each other, the first laser transmitter 28 may change operating parameters as the second device 24, e.g., the submersible gathers depth. The first laser transmitter 28 may also have at least one other selectable parameter and the first controller 30 is configured to select the parameter, which may include at least one of a spatial beam size, a spatial beam divergence, and a temporal width beam. In an example, these other selectable parameters could be adjusted by at least one of a spatial light modulator (SLM), grating assembly and telescoping lens shown generally at 38 and associated with the first laser transmitter 28.

As illustrated, the second device 24 may include a second laser transmitter 40 coupled to the second controller 34 and configured to generate a second laser beam. The first device 22 includes a first laser receiver 42 coupled to the first controller 30 and configured to receive the second laser beam. The first controller 30 is configured to select the selectable spatiotemporal beam shape based upon the second laser beam. For example, if the second device 24 is submerged at 30 meters depth, the second laser transmitter 40 may include data about how well the laser beam from the first device 22 was received at the second device 24. The first controller 30 may select a different spatiotemporal beam shape based upon the information and data received in the laser beam from the second laser transmitter 40. The second laser receiver 32 may include a bandpass filter 44 associated with the second laser receiver 32 that operates to filter extraneous light frequencies that impact the receiver's detector. Both first and second devices 22,24 may include similar components.

Figure 2:
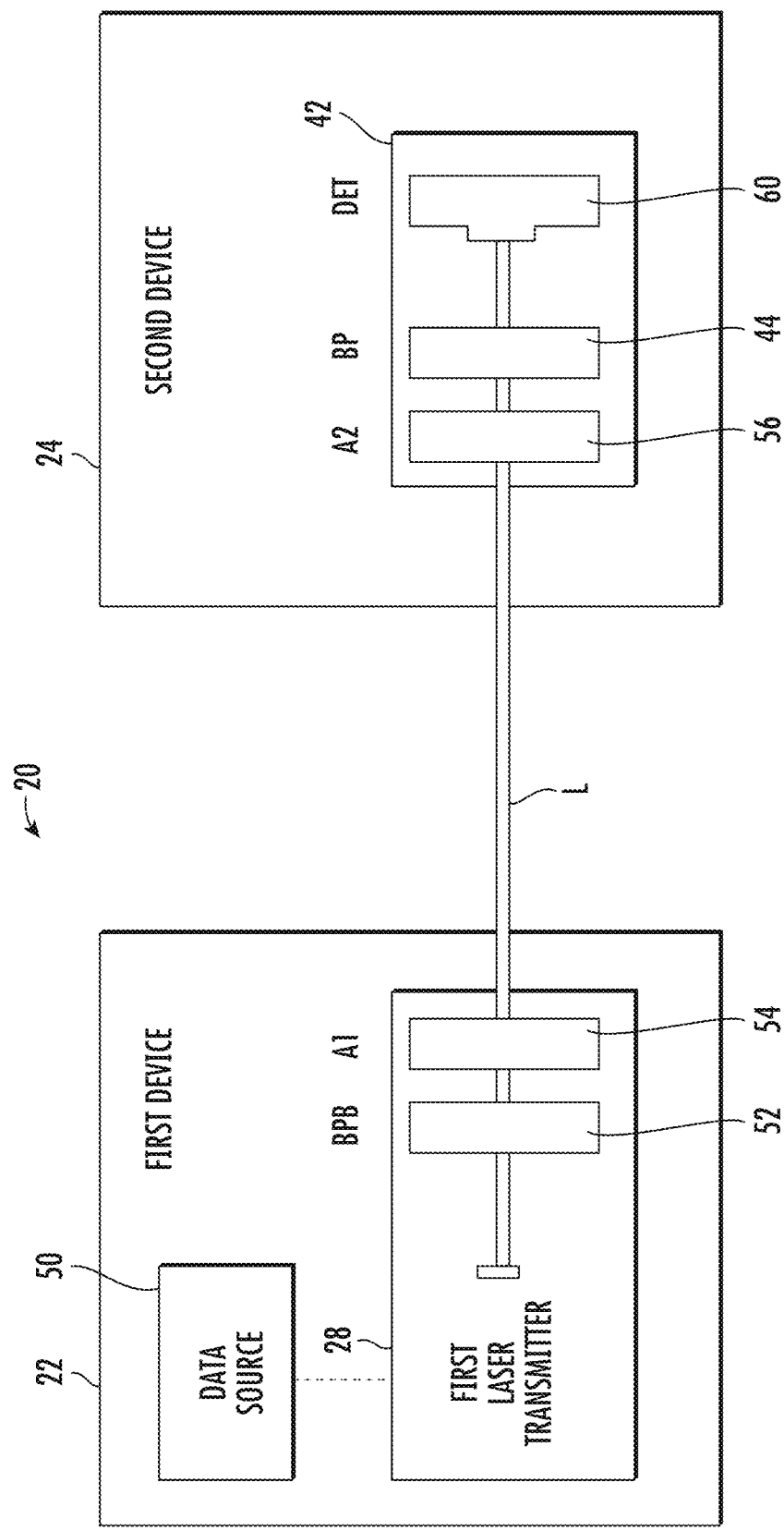
FIG. 2 is a schematic block diagram of first and second devices of the system in FIG. 1 and showing example components.

The schematic block diagram of FIG. 2 illustrates a specific set-up showing the first device 22 and second device 24 and an optical communications link (L), which in this example, is about a 150 meters communications link in clear open ocean. The first device 22 includes a data source 50, such as data received at a buoy, or stored instructions that are transmitted to a submersible as the second device 24 in a non-limiting example. The first laser transmitter 28 receives the data from the data source 50, for example, via the first controller 30. The first laser transmitter 28, in this example, may be a Thorlabs LD laser transmitter operating at a 1.0 GHz direct modulation speed and achieves a 20 milliwatt maximum output. A bank of beam parameters (BFP) 52 are selected via the first controller 30 and imparted via the spatial light modulator, grating assembly, or telescoping lens 38. The transmit aperture (A1) 54 in this example is about two (2) inches. At the second device 24, the receiver aperture (A2) 56 is about one-half (0.5) inch and the bandpass filter (BP) 44 is about 8 nanometers in this example. The detector 60 in an example is a 10 milliwatt maximum incidence power detector such as a Menlo APD 210 device that is AC coupled to block solar light and achieve optimal signal-to-noise calculations. The solar light may reduce the dynamic range of the detector 60, and thus, the detector is configured to allow only a maximum of 2.0 milliwatts of solar power onto the detector to avoid saturation effects in this example. A Menlo APD 210 detector 60 may have a wavelength range of about 400 to 1,000 nanometers and a frequency range of about 1.0 to about 1,600 MHz. It may include an avalanche detector for high sensitivity, a high-speed response of about 3 dB, and a bandwidth of about 5 MHz to about 1 GHz.

There are some considerations when cycling through the different beam parameters. For example, the spatial beam size at the first laser transmitter may be losslessly adjusted with an adjustable telescoping lens or with a spatial light modulator 38. Spatial divergence may be adjusted with misalignment of a telescoping lens apparatus. Different grating pairs in conjunction with a spatial light modulator 38 or even a MEMS system (not shown) may be used to create different spatiotemporal shapes for the beams, such as a Gaussian beam in space, a Bessel-Gaussian beam in space, or an Airy beam in time. The temporal width may be increased with dispersion for increasing the pulse width with a frequency chip or the dispersion and spectral compression may generate an unchirped signal, and transform a limited pulse with a larger temporal width.

As noted before, the selectable spatiotemporal beam shape may be selected based upon the range between the first device 22 and second device 24. A two-way delay may be estimated and phase differences measured between the first device 22 and second device 24 to provide ranging information. Alternative examples for ranging at the first device 22 may employ a retroreflective based ranging technique where the first laser transmitter 28 generates a light pulse and measures how long it takes for the pulse to return, and calculates the distance based on the time-of-flight of the laser pulse traversing the double path length.

It is also possible to employ an optical phase locked loop circuit for ranging, including sub-carrier modulation. A phase locked loop circuit (not illustrated) may include a phase detector, a loop filter, and an optical voltage controlled oscillator. Received local oscillator signals may be combined by a directional coupler and the resulting optical signal converted into the electrical domain by a photodiode or two balanced photodiodes in a balanced loop configuration. Other phase locked loop techniques may be employed.

The aperture at either the first laser receiver 42 and second laser receiver 32 may be increased or decreased using different aperture charging devices, including a motorized iris such as an IMS-37A motorized iris diaphragm from Pacific Laser Equipment of Tustin, Calif. That device uses two sets of blades, such as 2×8 steel blades, and a 29:1 stepper gear. The iris may fully open or close in about 3 seconds and may include an optical sensor to signal the stepper gear open or close the iris depending on a received laser beam.

The aperture may be changed based on optimized underwater communications system 20 requirements. For example, positioning, acquisition and tracking protocols are selected to communicate across a dynamically changing link environment when the first device 22 and second device 24 are moving rapidly relative to each other. As a result, the beam spatial size, beam divergence, beam shape, and beam temporal width may be selected for optimum operation. For example, a larger Gaussian spatial beam that is diverging rapidly may be required at first, and then the aperture is adjusted to maximize the throughput for that chosen optical profile. The aperture may be controlled by monitoring the power through the aperture for different options on a bank of beam shapes and profiles as part of the start-up procedure, or based on a pre-calibrated protocol knowing the trajectories of the various nodes. The aperture could be opened for establishing an optical communications link with a broad divergence beam at low data speeds and switched to a narrowly collimated beam with a smaller aperture for high-speed communications. An example is the description of the schematic block diagram in FIG. 2. A conventional state-of-art underwater communications system such as a multimodal or an adaptive phase approach has certain limitations, and the optical communications system 20 of FIGS. 1 and 2 may have 3-7 dB improvement with a range of continuous operation as compared to a state-of-art device operating adequately at 0 to 20 meters link communications in clear ocean water. The underwater communications system 20 as described, however, may operate in 0 to 55 meters with the same performance achievements.

Figure 3:
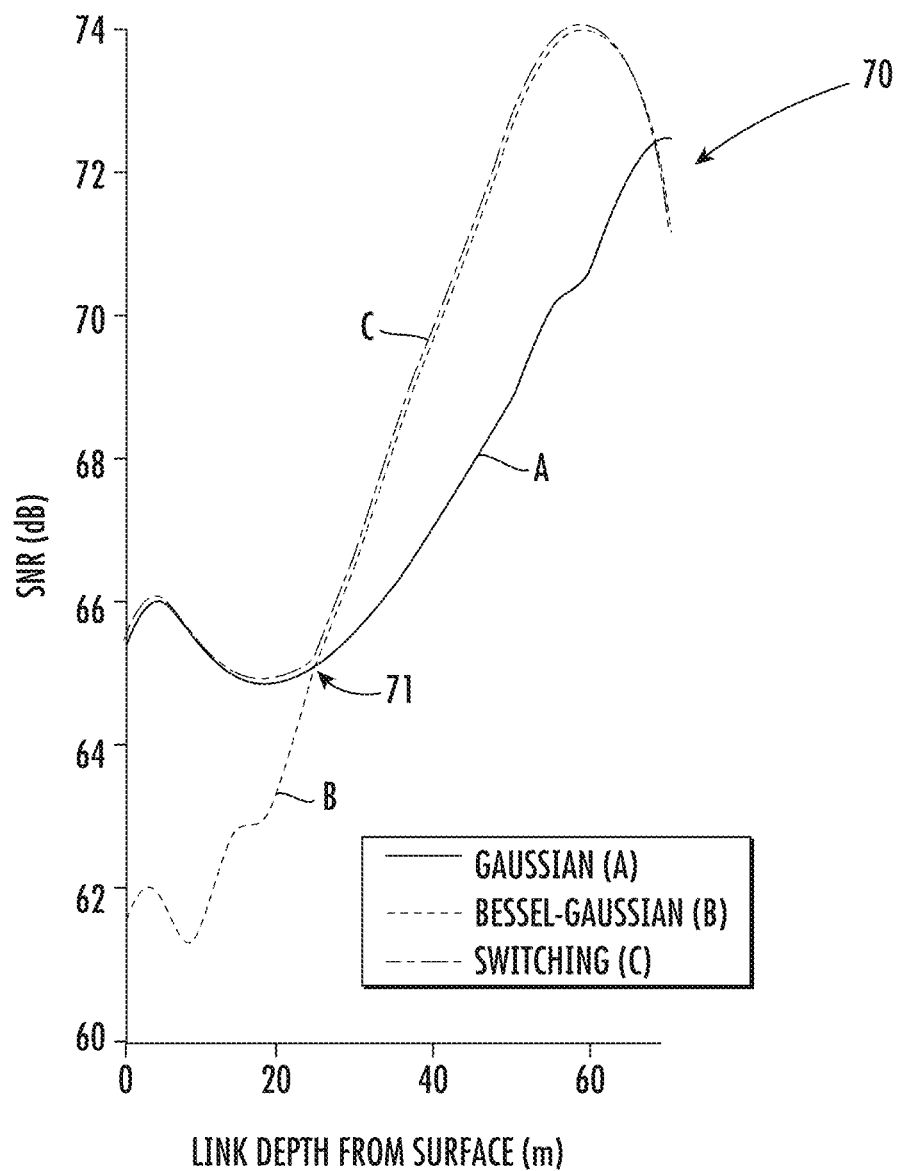
FIG. 3 is a graph showing an example of an optimized signal-to-noise ratio versus link depth for Gaussian and Bessel-Gaussian beam shapes.
Figure 4:
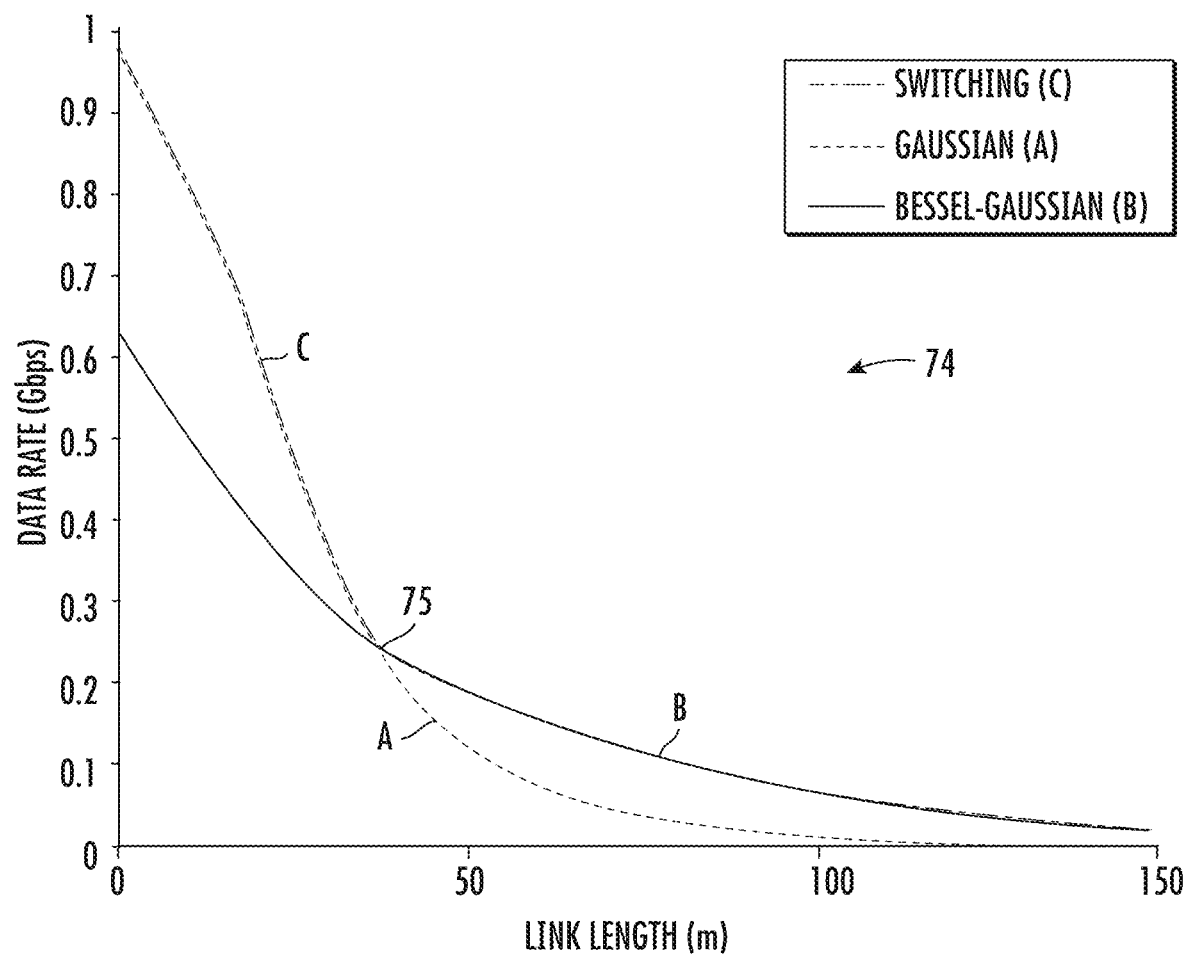
FIG. 4 is another graph similar to that shown in FIG. 3, but showing the data rate versus the link length for Gaussian and Bessel-Gaussian beam shapes.

Referring now to FIG. 3, there is illustrated at 70 a graph showing the signal-to-noise (SNR) in decibels relative to the link depth from the surface in meters, and showing a switch point 71 on the graph where the spatiotemporal beam shape switches at about 20 meters depth between the Bessel- Gaussian beam shape and the Gaussian beam shape. There may be some back-and-forth switching between about 20-60 meters, such that the first laser transmitter 28 in this example may switch between the Gaussian and Bessel-Gaussian beam shapes. A similar graph is illustrated at 74 in FIG. 4 showing the switching point 75 at about 40 meters. The data rate is highest for the Gaussian beam shape and then switches to a Bessel-Gaussian beam shape at about 40 meters. A 3 dB signal-to-noise ratio advantage is shown in these examples.

Solar photons may interfere with any detector 60 at the first laser receiver 42 or second laser receiver 32. The distance of a communications link may be extended even in the presence of solar photons by optimizing the signal-to-noise ratio in photon starved down links by varying both the first laser transmitter 28 beam profile and the second laser receiver 32 aperture with a software defined modem. For example, a battery powered buoy as the first device 22 may operate as a low SWaP surface vehicle and communicate with an unmanned underwater vehicle as the second device 24 that may be located 60 meters below water surface, where not many photons are available.

Figure 5:
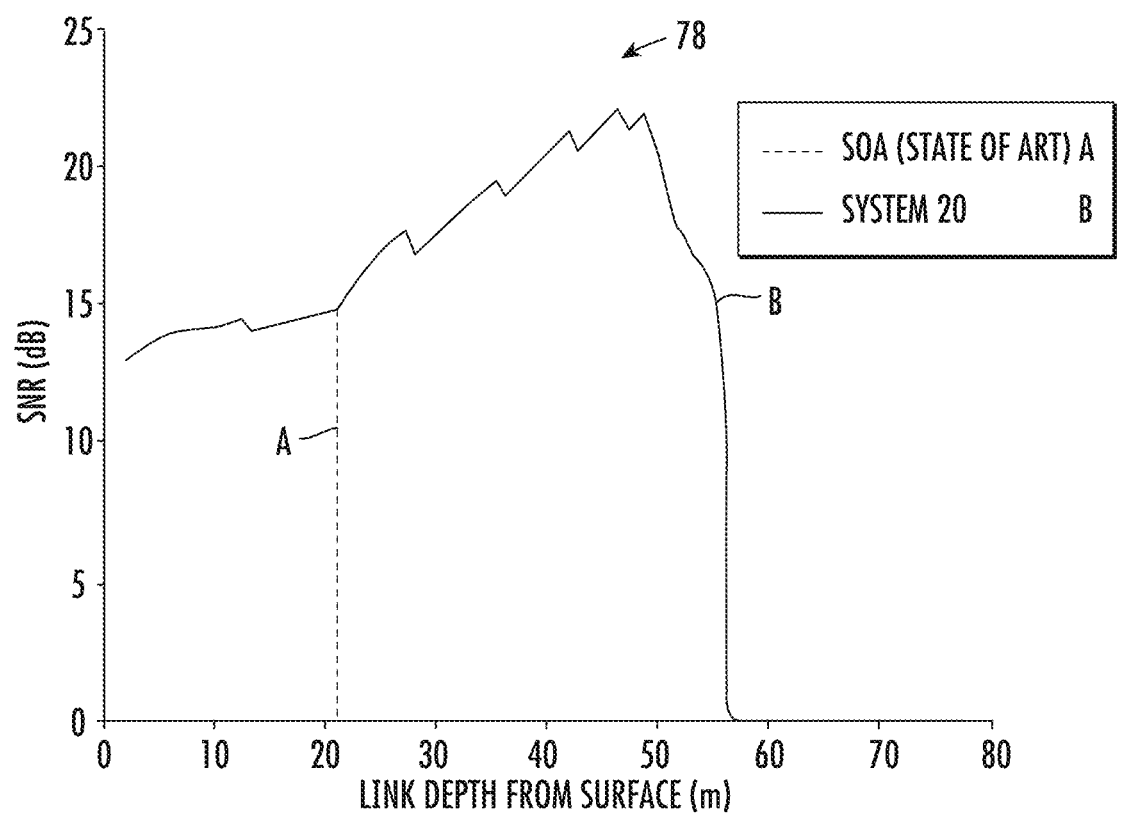
FIG. 5 is a graph comparing the link depth from the surface versus the signal-to-noise ratio for state-of-the-art systems and the underwater communications system of FIG. 1.

As shown in the graph at 78 in FIG. 5, the SNR relative to link depth for a state-of-the-art system using a multi-modal or adaptive phase approach is compared to the optical communications system 20 as described in FIGS. 1 and 2. The optical communications system 20 provides a continuous operation over 2.5 times the distance as the state-of-the-art approaches.

Figure 6:
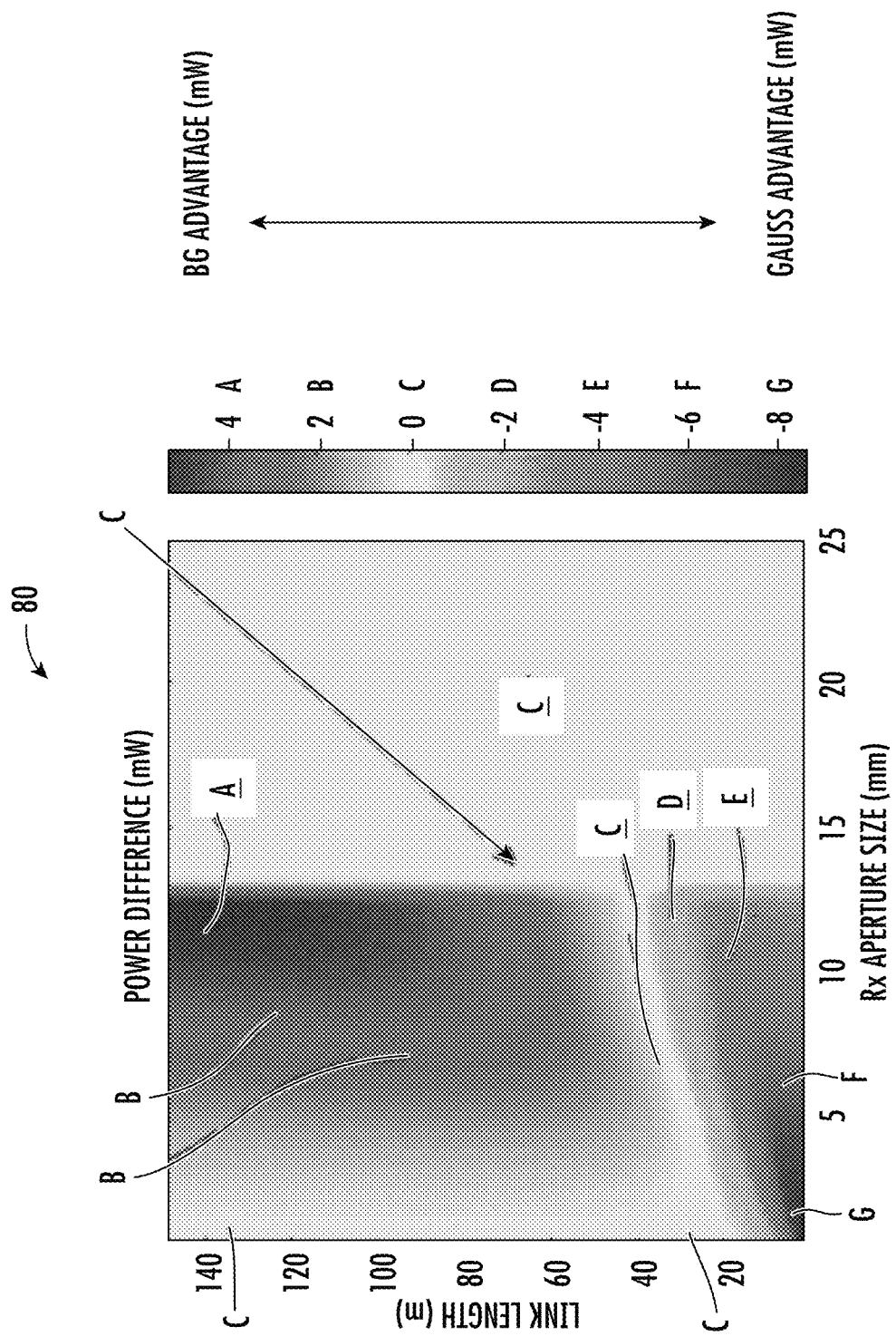
FIG. 6 is a graph showing the link length versus the receiver aperture size and the advantages between the Bessel-Gaussian and Gaussian beam shapes.

Referring now to FIG. 6, there is illustrated a graph at 80 showing the optical communications system 20 performance and the advantages of the Bessel-Gaussian beam versus the Gaussian beam relative to the receiver aperture size in millimeters versus the link length in depth from 0 to 150 meters and the power in milliwatts (mW) indicated by the letters A to G. Because of solar photons saturating the detector at a laser receiver 32,34, the aperture size from about 12.5 to 25 millimeters indicated generally at "C" may become more difficult to operate, and aperture sizes less than 12.5 may be more desirable as illustrated. For example, it is possible to compare the performance between a 1.0 millimeter spot size Gaussian beam and a 1.0 millimeter/1.0 inch spot size Bessel-Gaussian beam with the same average power transmitted through the aperture in a cross link at a depth of about 1.0 meter below the surface, where the communications link is defined based on the system. The optical communications system 20 performance may be limited by the components such as the maximum laser power, the maximum detectable power, and the solar radiation. The optical communications system 20 as described allows performance advantages above that achievable with the shape of beam alone.

Figure 7:
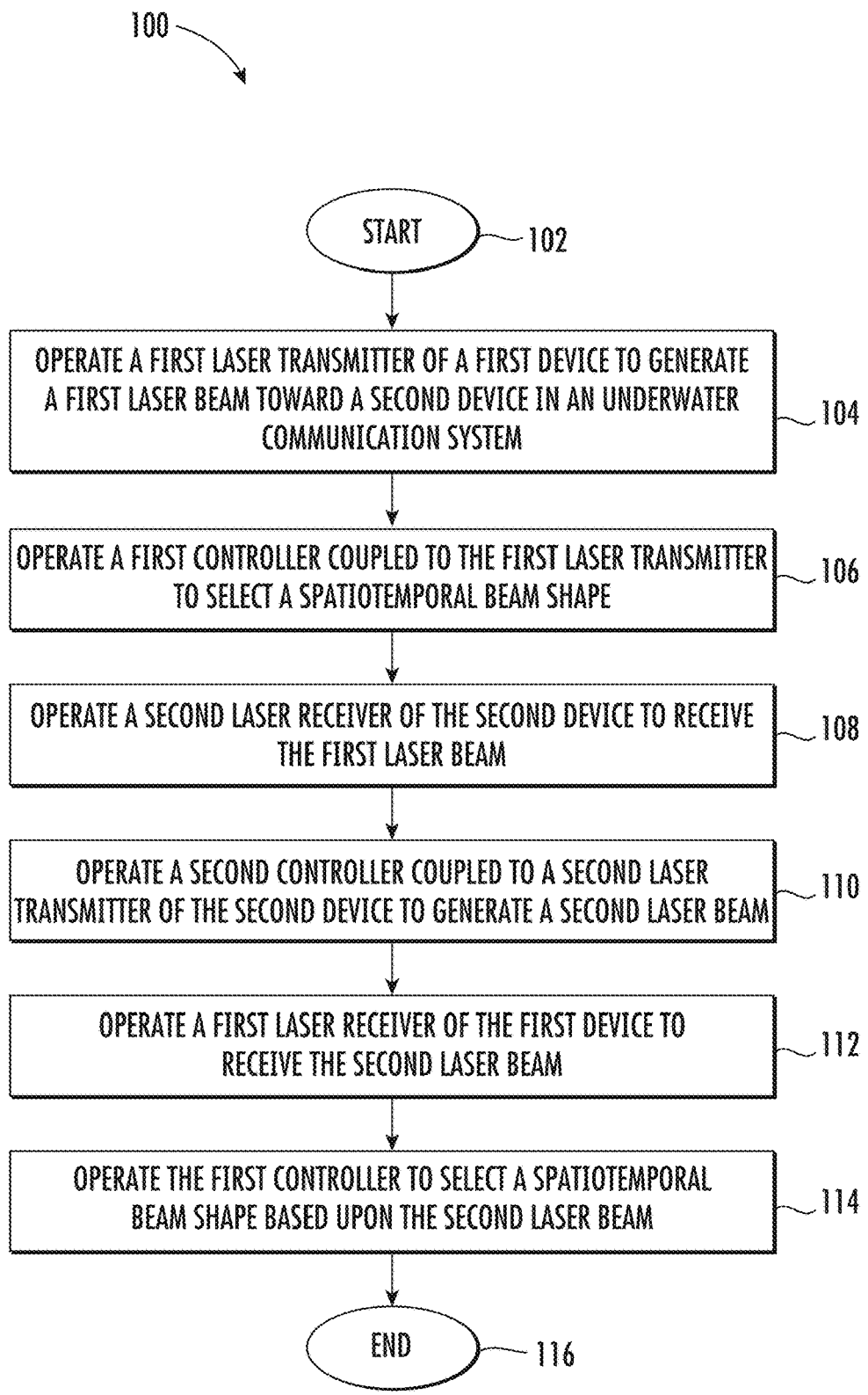
FIG. 7 is a high-level flowchart of a method for operating the underwater communications system of FIG. 1.

Referring now to FIG. 7, there is illustrated at 100 a high-level flowchart showing an example method of operating the first device 22 of the underwater communication system 20 that is movable relative to the second device 24. The process starts (Block 102) and the first laser transmitter 28 of the first device 22 is operated to generate a first laser beam to the second device 24 in the underwater communication system (Block 104). The underwater communications system 20 operates a first controller 30 coupled to the first laser transmitter 28 to select a spatiotemporal beam shape (Block 106). The second laser receiver 32 of the second device 24 is operated to receive the first laser beam (Block 108). The second controller 34 coupled to the second laser transmitter 40 of the second device 24 is operated to generate a second laser beam (Block 110). The first laser receiver 24 of the first device 22 is operated to receive the second laser beam (Block 112). The first controller 30 is operated to select a spatiotemporal beam shape based upon the second laser beam (Block 114). The process ends (Block 116).

It is possible that the components for the first device 22 and second device 24 may be retrofitted from commercial off-the-shelf (COTS) components such as a programmable aperture or spatial light modulator with software updates to provide the ability to select desired sub-carriers from a bank of spatiotemporal beam shapes and similar parameters. The optical communications system 20 provides advantages over state-of-the-art multi-modal and adaptive phase approaches as described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An underwater communications system comprising:
   a first and a second device being movable relative to one another underwater;
   the first device comprising
      a first laser transmitter configured to generate a first laser beam having a selectable spatiotemporal beam shape from among a plurality thereof, and
      a first controller coupled to the first laser transmitter and configured to select a spatiotemporal beam shape for the first laser beam from among the plurality of spatiotemporal beam shapes, wherein the plurality of spatiotemporal beam shapes comprises a Gaussian beam shape and a Bessel-Gaussian beam shape;
   the second device comprising
      a second laser receiver configured to receive the first laser beam, and
      a second controller coupled to the second laser receiver.

2. The underwater communications system of claim 1 wherein the first controller is configured to select the selectable spatiotemporal beam shape based upon a range between the first and second devices.

3. The underwater communications system of claim 2 wherein the first controller is configured to select the selectable spatiotemporal beam shape based upon the range between the first and second devices in accordance with one of a start-up procedure and a predetermined protocol.

4. The underwater communications system of claim 2 wherein the second device comprises a second laser transmitter coupled to the second controller and configured to generate a second laser beam; wherein the first device comprises a first laser receiver coupled to the first controller and configured to receive the second laser beam; and wherein the first controller is configured to select the selectable spatiotemporal beam shape based upon the second laser beam.

5. The underwater communications system of claim 1 wherein the first laser transmitter also has at least one other selectable parameter; and wherein the first controller is configured to select the at least one other selectable parameter.

6. The underwater communications system of claim 5 wherein the at least one other selectable parameter comprises at least one of a spatial beam size, a spatial beam divergence, and a temporal width beam.

7. The underwater communications system of claim 5 wherein the first device comprises at least one of a spatial light modulator, grating assembly, and telescoping lens associated with the first laser transmitter.

8. The underwater communications system of claim 5 wherein the second device comprises a bandpass filter associated with the second laser receiver.

9. A first device of an underwater communications system and being moveable underwater relative to a second device of the underwater communications system, the first device comprising:
a first laser transmitter configured to generate a first laser beam toward the second device and having a selectable spatiotemporal beam shape from among a plurality thereof; and
a first controller coupled to the first laser transmitter and configured to select a spatiotemporal beam shape for the first laser beam from among the plurality of spatiotemporal beam shapes, wherein the plurality of spatiotemporal beam shapes comprises a Gaussian beam shape and a Bessel-Gaussian beam shape.

10. The first device of claim 9 wherein the first controller is configured to select the selectable spatiotemporal beam shape based upon a range between the first and second devices.

11. The first device of claim 10 wherein the first controller is configured to select the selectable spatiotemporal beam shape based upon the range between the first and second devices in accordance with one of a start-up procedure and a predetermined protocol.

12. The first device of claim 10 wherein the second device comprises a second laser transmitter configured to generate a second laser beam; wherein the first device comprises a first laser receiver coupled to the first controller and configured to receive the second laser beam; and wherein the first controller is configured to select the selectable spatiotemporal beam shape based upon the second laser beam.

13. The first device of claim 9 wherein the first laser transmitter also has at least one other selectable parameter; and wherein the first controller is configured to select the at least one other selectable parameter.

14. The first device of claim 13 wherein the at least one other selectable parameter comprises at least one of a spatial beam size, a spatial beam divergence, and a temporal width beam.

15. The first device of claim 9 wherein the first device comprises at least one of a spatial light modulator, grating assembly, and telescoping lens associated with the first laser transmitter.

16. A method of operating a first device of an underwater communications system and being moveable underwater relative to a second device of the underwater communications system, the method comprising:
operating a first laser transmitter of the first device to generate a first laser beam toward the second device and having a selectable spatiotemporal beam shape from among a plurality thereof; and
operating a first controller of the first device to select a spatiotemporal beam shape for the first laser beam from among the plurality of spatiotemporal beam shapes, wherein the plurality of spatiotemporal beam shapes comprises a Gaussian beam shape and a Bessel-Gaussian beam shape.

17. The method of claim 16 comprising operating the first controller to select the selectable spatiotemporal beam shape based upon a range between the first and second devices.

18. The method of claim 17 comprising operating the first controller to select the selectable spatiotemporal beam shape based upon the range between the first and second devices in accordance with one of a start-up procedure and a predetermined protocol.

19. The method of claim 17 comprising operating a second laser transmitter of the second device to generate a second laser beam; operating a first laser receiver coupled to the first controller of the first device to receive the second laser beam; and selecting the selectable spatiotemporal beam shape based upon the second laser beam.

20. The method of claim 16 wherein the first laser transmitter also has at least one other selectable parameter; and comprising operating the first controller to select the at least one other selectable parameter.

21. The method of claim 20 wherein the at least one other selectable parameter comprises at least one of a spatial beam size, a spatial beam divergence, and a temporal width beam.

22. The method of claim 16 wherein the first device comprises at least one of a spatial light modulator, grating assembly, and telescoping lens associated with the first laser transmitter.

* * * * *